United States Patent
Serban et al.

(10) Patent No.: US 6,705,642 B1
(45) Date of Patent: Mar. 16, 2004

(54) DEVICE FOR CONTROLLED DEFLATION OF A GAS BAG

(75) Inventors: Bogdan Serban, Niederkorn (LU); Ernst Johann Hauer, Steinheim (LU); Michel Witte, Luxembourg (LU); Volker Petri, Aidlingen (DE); Harald Rudolf, Tübingen (DE); Michael Meyer, Alfdorf (DE)

(73) Assignees: I.E.E. International Electronics & Engineering S.a r.l., Luxembourg (LU); Daimlerchrysler AG, Stuttgart (DE)

(*) Notice: Subject to any disclaimer, the term of this patent is extended or adjusted under 35 U.S.C. 154(b) by 1 day.

(21) Appl. No.: 10/049,929
(22) PCT Filed: Aug. 30, 2000
(86) PCT No.: PCT/EP00/08460
 § 371 (c)(1),
 (2), (4) Date: Feb. 20, 2002
(87) PCT Pub. No.: WO01/15942
 PCT Pub. Date: Mar. 8, 2001

(30) Foreign Application Priority Data

Aug. 31, 1999 (LU) ............................................. 90431

(51) Int. Cl.⁷ ............................................. B60R 21/28
(52) U.S. Cl. ................................... 280/739; 280/735
(58) Field of Search ........................... 280/739, 734, 280/743.1, 731, 732, 735

(56) References Cited

U.S. PATENT DOCUMENTS

| | | | | |
|---|---|---|---|---|
| 5,219,179 A | * | 6/1993 | Eyrainer et al. | 280/739 |
| 5,518,269 A | * | 5/1996 | Storey et al. | 280/739 |
| 5,588,671 A | * | 12/1996 | Boumarafi et al. | 280/730.2 |
| 5,797,619 A | * | 8/1998 | Bauer et al. | 280/728.3 |
| 5,899,494 A | * | 5/1999 | Lane, Jr. | 280/739 |
| 5,957,490 A | * | 9/1999 | Sinnhuber | 280/735 |
| 6,131,949 A | * | 10/2000 | Lewis et al. | 280/739 |
| 6,241,279 B1 | * | 6/2001 | Ochiai | 280/735 |
| 6,378,898 B1 | * | 4/2002 | Lewis et al. | 280/733 |

FOREIGN PATENT DOCUMENTS

| | | |
|---|---|---|
| EP | 0 836 971 A1 | 4/1998 |
| GB | 2 306 409 A | 5/1997 |
| WO | WO 00/35719 * | 6/2000 |

OTHER PUBLICATIONS

Yaniger, S.I.: "Force Sensing Resistors: A Review of the Technology": Electro International Conference record, US, western Periodicals Co., Ventura, CA; vol. 16, Apr. 16, 1991, pp. 666–668, XP000288444.

* cited by examiner

Primary Examiner—David R. Dunn
(74) Attorney, Agent, or Firm—McCormick, Paulding & Huber LLP

(57) ABSTRACT

A device for deflating a gas bag includes a gas bag having a deflation opening which is closed along a breakable, predetermined line. The predetermined breaking line includes a closure element and is breakable by melting or sublimating the closure element.

20 Claims, 6 Drawing Sheets

Fig 6
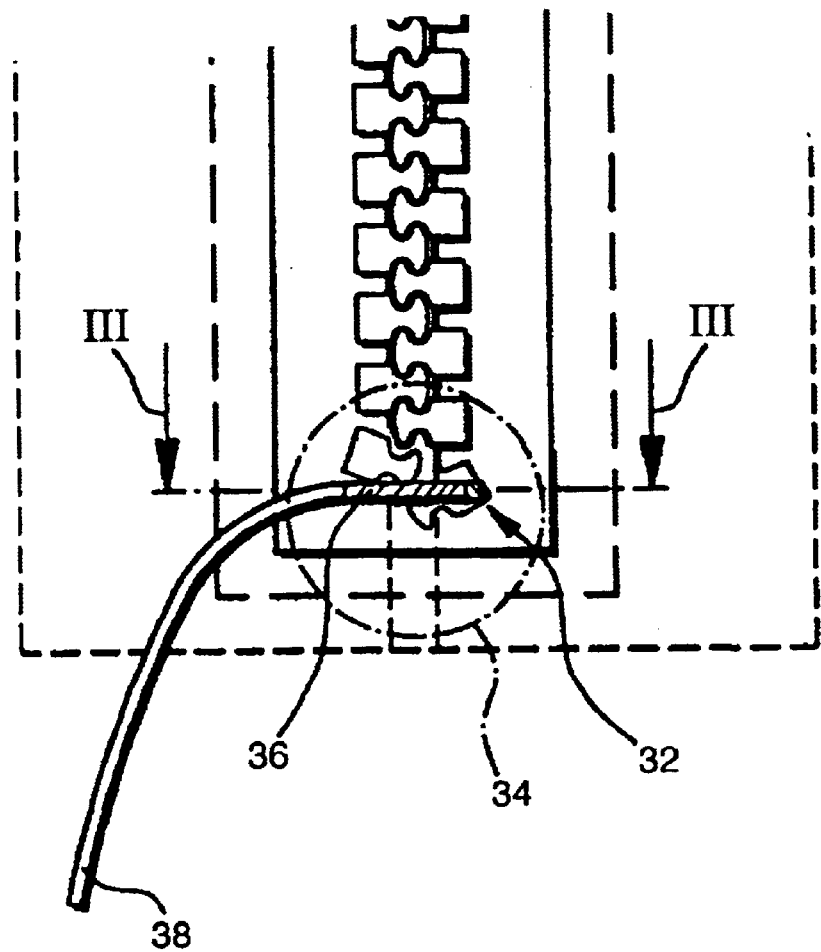
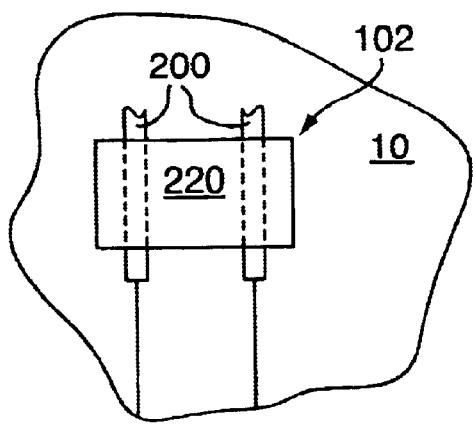
Fig. 8
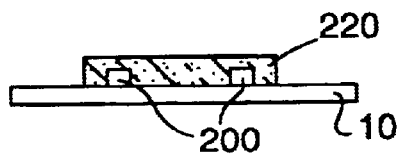
Fig. 9

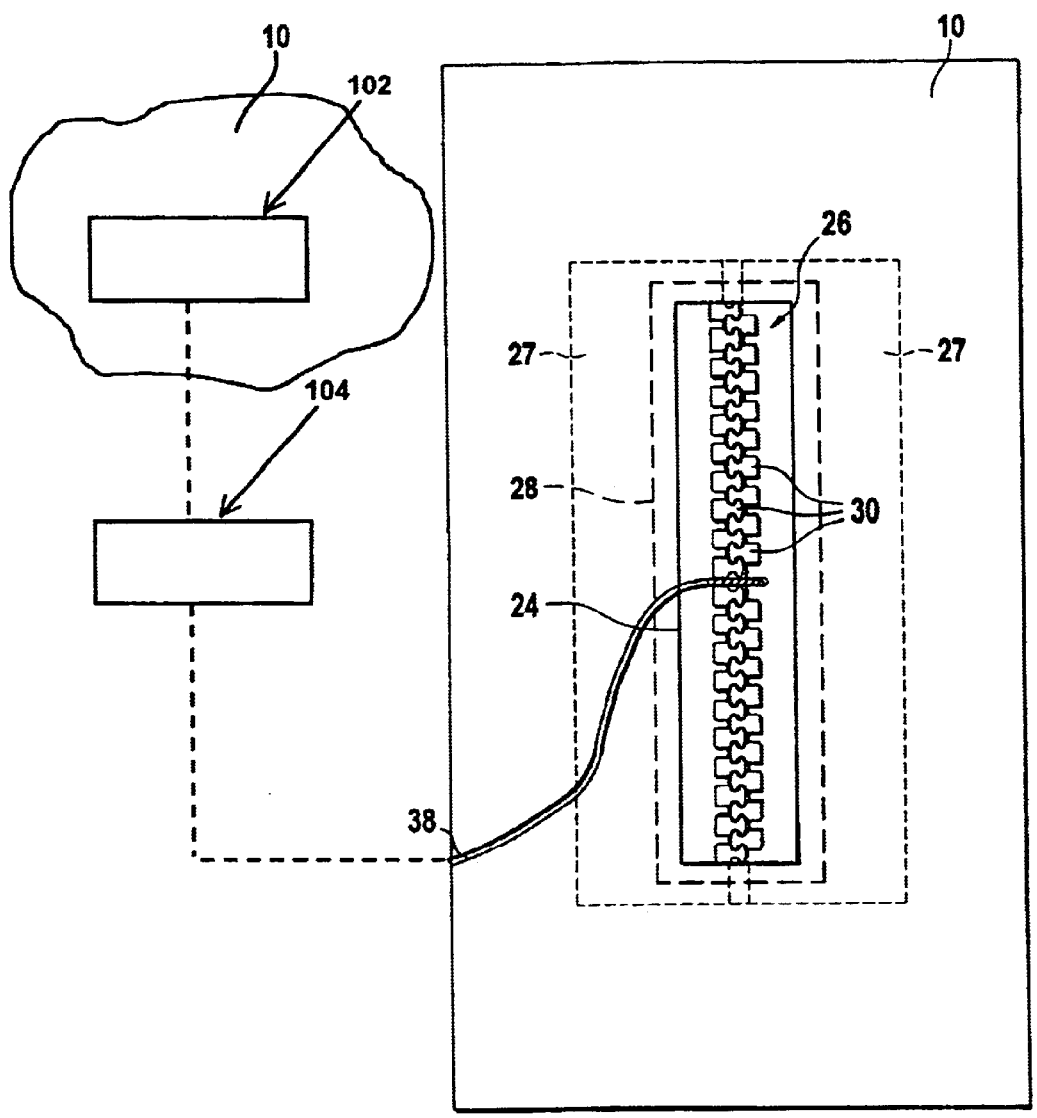

DEVICE FOR CONTROLLED DEFLATION OF A GAS BAG

FIELD OF THE INVENTION

The present invention relates to a device for deflating a gas bag, in particular for deflating an airbag in an active passenger safety system in a vehicle.

BACKGROUND OF THE INVENTION

In order to reduce the risk of injury to passengers in a vehicle in the event of a traffic accident, modern vehicles are increasingly equipped with an active passenger safety system. An active passenger safety system of this kind generally comprises one or more airbags, which are inflated extremely quickly in the event of an impact of the vehicle, and which absorb the energy released by the passenger on impact.

The airbag, for example a frontal airbag, is released from the dashboard respectively the impact cup of the steering wheel at a very high velocity (200 to 300 km per hour). In order to avoid injuries to the passenger caused by the release of the airbag it is therefore advantageous to interrupt or control the complete inflation or unfolding of the airbag, as soon as the passenger has plunged sufficiently far into the airbag and an adequate pressure has built up in the airbag to absorb the energy of the passenger safely. Because the time at which the passenger has plunged sufficiently far into the airbag depends very strongly on the seating position of the passenger at the time of the accident, the interruption of the inflation procedure of the airbag may become necessary at any stage of its release.

Since an inflation device which functions on the basis of pyrotechnology, a so-called inflator, cannot, as a result of the system, be interrupted at any desired time in its function, a passenger safety system must consequently comprise a device for targeted deflation of said airbag in order to control the interruption of the release procedure of the airbag. A device of this kind must allow the gas introduced by the inflator into the airbag to be released at any desired time in order to prevent the continued inflation of the airbag.

A device is known from WO-A-98/01323, in which the gas bag comprises a deflation opening, which is closed at a predetermined breaking line. The breaking line is designed in such a manner that it remains intact below a predetermined target pressure within the airbag, and automatically breaks open under the influence of said pressure above the target pressure. A predetermined breaking line of this type is generally achieved through a careful, technically accurately dimensioned weakening of the material used. Such a weakening of the material can be achieved e.g. by a perforation, in which small incisions are made along the predetermined breaking line. In another embodiment, the predetermined breaking line is produced when closing said airbag by means of a seam produced by stitching, whereby the thread used for stitching and the spacing between stitches is adapted accurately to the requirements for the release of the airbag. Alternatively, the airbag skin may also be sealed by welding, e.g. by ultrasound welding, with exactly adapted welding patterns. In this case, the welding seam is the predetermined breaking line.

The problem with predetermined breaking lines of this kind, which break open automatically under the pressure from the airbag, is that, as a result of manufacturing tolerances, it is extremely difficult to accurately adjust the required target pressure at which the predetermined breaking line breaks open.

SUMMARY OF THE INVENTION

The object of the present invention is consequently to propose another device for the targeted deflation of a gas bag.

According to the present invention, this object is achieved with a device for deflating a gas bag, in particular an airbag, wherein said gas bag comprises at least one deflation opening, which is sealed at a breakable, predetermined breaking line, and wherein said predetermined breaking line comprises a closure element, which can be broken open by allowing said closure element to melt or sublime.

By contrast with the previously known devices, the device according to the present invention is released actively by the melting or burning of the closure element, and the predetermined breaking line is broken open. This means that the breaking open of the predetermined breaking line can be controlled accurately at any given time. The deflation device can, for example, be released by an airbag control module, after a sensor device has detected an inflation volume of the airbag adequate for the absorption of the energy released.

A further advantage of the device according to the invention is in the separation of the release function (melting or burning said closure element) and the breaking open function of the predetermined breaking line. Accordingly, the predetermined breaking line can be optimized to break open rapidly without expenditure of force and without impairing too extensively the mechanical strength of the predetermined breaking line in the closed condition of the deflation opening. In fact, on the one hand, the predetermined breaking line must break open easily and without the expenditure of force when the device is released, in order to release the deflation opening of the airbag within the shortest possible time. On the other hand, the folded airbag must be safely sealed in order to guarantee inflation in the event of an impact. Especially during production of the airbag and installation into the vehicle, the airbag must withstand deformations and loading arising in this context, without suffering damage which could reduce its proper function throughout its required operating life. The separation of the various functions in the device according to the invention allows these contradictory demands on the system to be met.

In a first advantageous embodiment, the predetermined breaking line comprises a closure seam produced through an appropriate manufacturing technique in the material of the gas bag, and the closure element comprises a seam fiber determined by the manufacturing technique and made from the material the gas bag. With this embodiment, an electrical element, especially an electrically conductive heating fiber is associated with the seam fiber, which heats the seam fiber at at least one position up to a temperature above the melting temperature of the material of the gas bag when an electrical current is passed through it. As soon as the seam fiber is broken through at at least one position, the closure seam can, if designed appropriately using special weaving respectively knitting techniques, be opened without the expenditure of force, thereby releasing the deflation opening.

In a second advantageous embodiment, the predetermined breaking line comprises a closure seam, and the closure element comprises a seam fiber made from electrically conductive material. The melting or sublimation of the closure element can, in this embodiment, be achieved directly by passing an electrical current through the closure element.

In a further advantageous embodiment, the predetermined breaking line comprises a first and second row of closure members, wherein the closure members of the first row are arranged at a first edge of the deflation opening of the gas bag, and the closure members of the second row are arranged in such a manner at a second edge of the deflation opening of the gas bag that the closure members of the first row and the closure members of the second row are offset in the direction of the predetermined breaking line, and wherein the closure members of the first row and the closure members of the second row interlock to form a keyed closure in the sealed condition of the gas bag, as is realized, for example, in the case of a zip fastener. The predetermined breaking line can, for example, be designed as a slide-less zip fastener, i.e. as a zip fastener in which the closure element for producing the keyed closure, the so-called slide or glide, is removed, wherein the zip fastener is worked into the deflation opening of the gas bag. In this case, the closure element preferably comprises an electrically conductive fiber, which holds together the first and second row of closure members at at least one position.

It should be noted that the airbag is made from an appropriate textile material into which the zip fastener can be worked with its lateral textile strips. The working-in of the zip fastener element as a closure at the deflation opening of the airbag can be achieved in this context, for example, by stitching, ultrasound welding or other fastening techniques.

The zip fastener offers considerable strength transversely to the direction of opening through the keyed connection of the closure members, so that an airbag of this kind satisfies the high demands for handling during installation of the airbag system into the vehicle, and damage to the installed components can largely be excluded.

However, in its normal use, a zip fastener can readily be opened in its longitudinal direction of opening by the so-called slide or glide, and remains open under slight loading only up to the position, which has been opened by the slide. If the slide is removed after closing, the zip fastener can, if it is opened at one point, be opened unhindered along its entire length as soon as both ends are pulled apart by separating the keyed connection of the closure members even with a very slight expenditure of force. With the opening mechanism described, the separation of the keyed connection of the closure members is readily achieved and a secure opening of the deflation opening along the predetermined breaking line is guaranteed. Since only the keyed connection of the closure members must be removed, only a very small amount of force is required for this, and the rate of opening is sufficiently rapid for the requirements of the system.

At least one of the rows of closure members preferably comprises a gap, such that the chain formed in the closed condition of the gas bag by the interlocking closure members is interrupted at one position and comprises an opening. The opening position of the closure members may also be formed in that the closure members of the first row and the closure members of the second row do not interlock at one position. For example, the initial members of each of the rows may not be connected with one another, as shown in FIG. 6. It should be noted, that in this context, "chain" is used in the sense of an "uninterrupted row of similar components". As a result of the opening in the closure elements connected by keyed connection, the zip fastener is opened with a small expenditure of force by the loading from the opening airbag after the melting of the closure element. This proposal exploits a normally undesirable property of zip fasteners according to which they fail in the absence of even a single one or of a few of the keyed closure elements, and in this context, open without an expenditure of force.

In both cases, the electrically conductive fiber holds the first and the second row of closure members together preferably in the region of the opening. This may, for example, be achieved in that the closure element encloses the first and second row of closure members, and, accordingly, in the normal condition prevents the two rows of closure members from being pulled apart by the pressure predominating in the gas bag and the keyed connection between the closure members being removed. Alternatively—and especially in the case of one embodiment in which at least some of the closure members of the first and second row are designed in a loop-shaped manner such that the chain formed in the closed condition of the gas bag by the interlocking closure members comprises a longitudinal channel at one position in the interior of the loop-shaped closure members in the direction of the predetermined breaking line—the closure element is inserted into the longitudinal channel, and accordingly prevents the keyed closure between the two rows of closure members from tearing apart.

It should be noted that the device described above for deflating a gas bag is particularly suitable for use in a so-called "intelligent" passenger safety system for a vehicle. A passenger safety system of this kind comprises in addition to the deflation device, at least one airbag with a control device 104 and a sensor device 102 for detecting the relative position of the passenger relative to the airbag, as shown in FIG. 7. The control device controls the device for deflating the gas bag on the basis of a position signal determined by the sensor device at a given position of the passenger relative to the airbag and releases it. To this end, the control device evaluates the position signal from the sensor device, for example, with reference to pressure and/or time, i.e. with reference to the internal pressure of the airbag respectively the pressure which the airbag exerts on the passenger and/or the time during which this pressure acts on the passenger In one advantageous embodiment, shown in FIG. 7, the sensor device comprises at least one sensor 102, which is arranged on the airbag in a region facing the passenger when the airbag is released. The sensor may be, for example a force sensor arranged on the airbag, which responds to the pressure exerted by the airbag on the passenger and converts this into an appropriate electrical signal. Such a force sensor is illustrated in FIGS. 8 and 9 and advantageously comprises at least two electrode structures 200 which are attached at a given distance from one another to the textile carrier material of the airbag 10 and a layer of semiconductor material 220, which is attached via the electrode structures to an active area of the sensor in direct contact with the electrode structures, whereby the layer of semiconductor material comprises an internal resistance, which is variable in dependence upon a deformation of the layer. The textile carrier material may be any soft textile material. In one variant, which is particularly advantageous because of its simplicity, the textile material is the actual material of the airbag, whereby the electrode structures are attached directly to the airbag.

A sensor of this kind is manufactured without rigid carrier layers, as is conventional, for example, in currently available foil pressure sensors. As a result, the sensor comprises a very high capability for deformation, so that the sensor can readily be folded together with the airbag. Moreover, any risk of injury to the passenger resulting from the sensor can largely be excluded because of the softness of the sensor.

It should be noted, that instead of the force sensor, a capacitive distance sensor with at least one electrode structure arranged on the airbag or an inductive distance sensor with at least one inductive coil arranged on the airbag and supplied with an alternating voltage may also be used.

BRIEF DESCRIPTION OF THE DRAWINGS

Various embodiments of the invention will now be described with reference to the enclosed figures. The figures are as follows:

FIG. 6 illustrates an alternative embodiment of the two rows of closure members not interlocking at the end regions of the zip fastener.

FIG. 7 illustrates a sensor device mounted on an airbag and an associated control device.

FIGS. 8 and 9 illustrate one embodiment of the present invention in which the sensor device of FIG. 7 is comprised of at least two electrode structures which are arranged at a given distance relative to one another on a textile carrier material and a layer made from a semiconductor material.

DESCRIPTION OF THE PREFERRED EMBODIMENT

Figure 1:
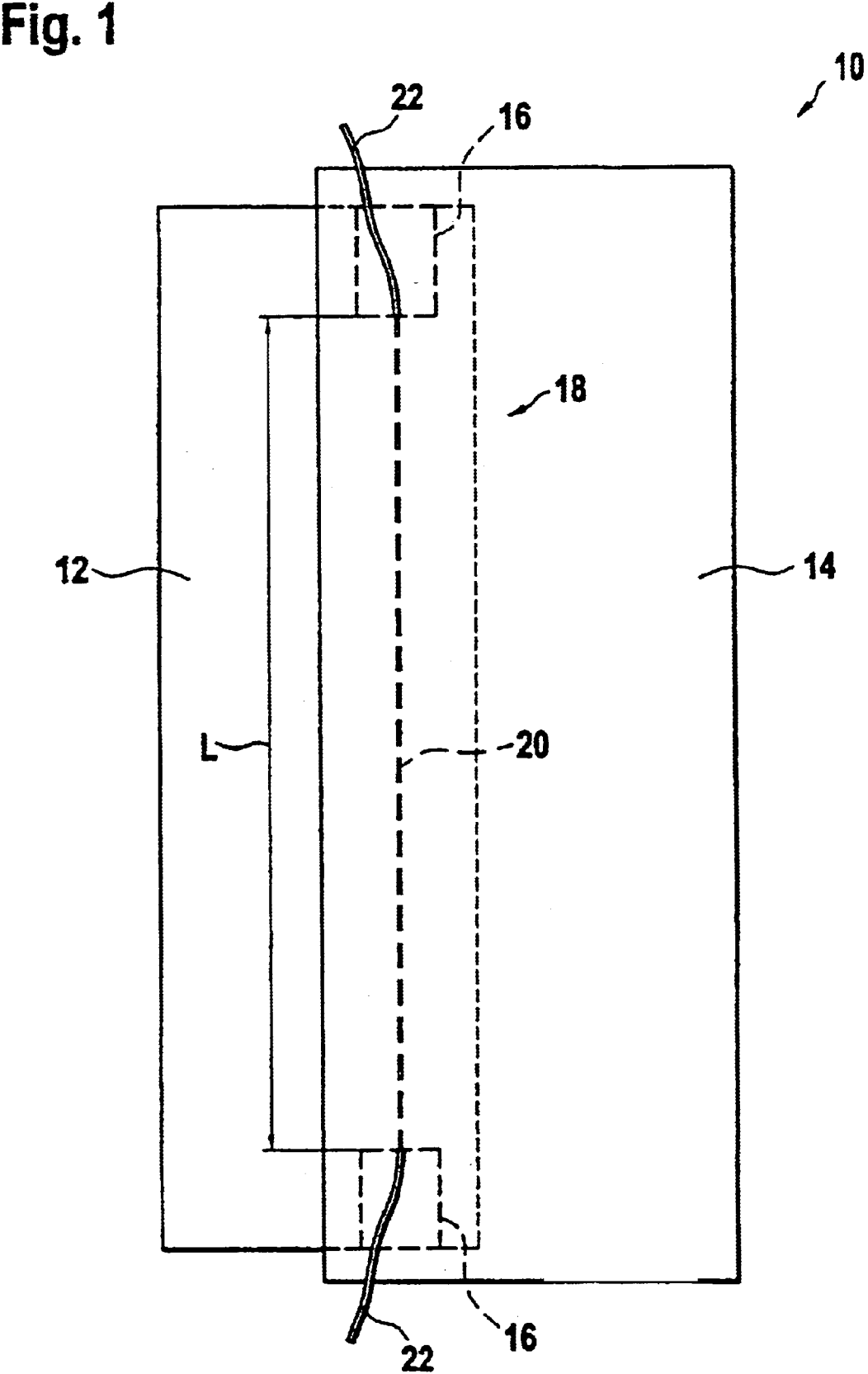
FIG. 1: an embodiment with a melting seam as the closure element

FIG. 1 shows a first embodiment of the present invention. In this context, FIG. 1 shows a section of an airbag 10, in particular in the region in which two parts 12 and 14 of the airbag are stitched together. The two parts 12 and 14 overlap in the region shown and are normally stitched together with a single seam or a seam of several rows 16.

To create an appropriate deflation opening 18, the normal seam 16 in the present embodiment is interrupted at a given length L. The length L of the interruption of the seam 16 corresponds to the desired length of the deflation opening.

In order to close the airbag, the two parts 12 and 14 of the airbag are stitched together in the region of the interruption of the normal seam 16 by means of a sewing thread 20 capable of melting or sublimation. The melting thread 20 may, for example, comprise a metal thread the two ends of which are connected to a current supply 22. When an appropriate electrical current is passed through the metal thread 20, it is heated up to a temperature above its melting temperature so that the melting seam is torn open. As soon as the thread 20 has broken in at least one position, the closure seam can, with an appropriate design through special weaving respectively knitting techniques, be opened without the expenditure of force thereby releasing the deflation opening 18.

Figure 2:
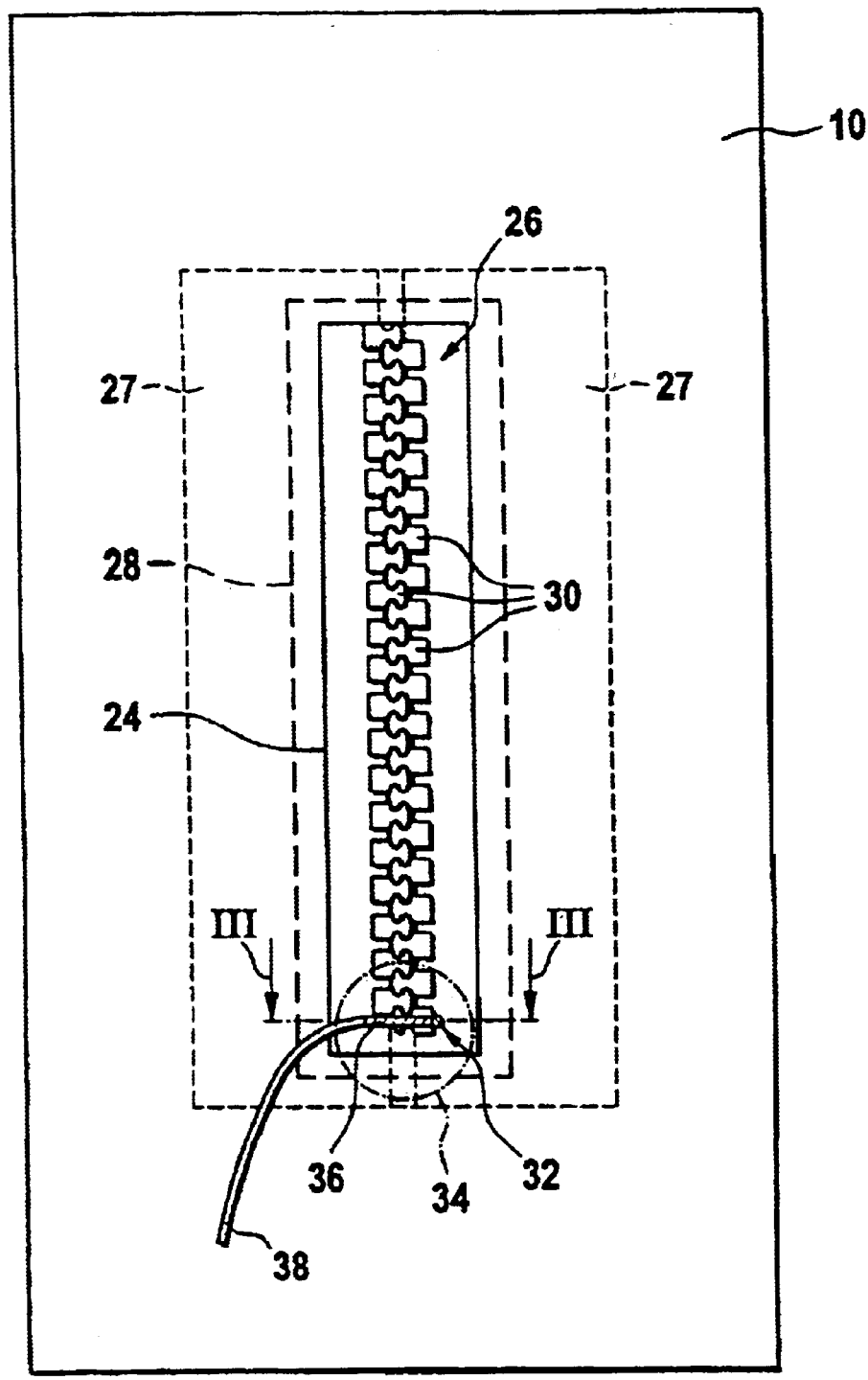
FIG. 2: an embodiment with a zip-fastener closure and melting wire

Another embodiment of the device for deflating a gas bag is shown in FIG. 2. The section of the airbag 10 shown here comprises an opening 24, in which a suitable zip fastener 26 is attached. The zip fastener is preferably worked into the airbag material inside the airbag with its lateral textile strips 27 by means of a continuous seam 28.

A zip fastener offers a considerable strength transversely to the direction of opening as a result of the keyed connection of its closure members 30, so that an airbag fitted with a zip fastener of this kind satisfies the demanding requirements for handling during installation of the airbag system into the vehicle, and damage to the installed parts can largely be excluded.

The zip fastener closure 26 is preferably designed as a slide-less zip fastener, i.e. as a zip fastener in which the closure element for production of the keyed connection between the closure members 30, the so-called slide or glider, has been removed. A zip fastener of this kind can, if it is opened at one position, be opened along its entire length unhindered with an extremely small expenditure of force, as soon as the two ends are pulled apart.

To ensure that the zip fastener 26 does not open unintentionally, at least one closure element 32 capable of melting or sublimation is associated with the zip fastener, which holds together the two interlocking rows of closure members 30, for example in at least one of the end regions 34 of the zip fastener 26. At the opposing end region, the two rows of closure members can be held together by an appropriate stitching of the end region to the airbag material or by any desired end member (not shown), which encloses the two rows of teeth. Alternatively, a closure element capable of melting or sublimation may also be attached at this end of the zip fastener. Independently of the design, the-keyed closure of the two rows of teeth of the zip fastener is secured under normal conditions from separation. If the deflation opening is to be released, the closure element is destroyed by melting or sublimation, and the security against the separation of the-keyed closure is removed.

Figure 3:
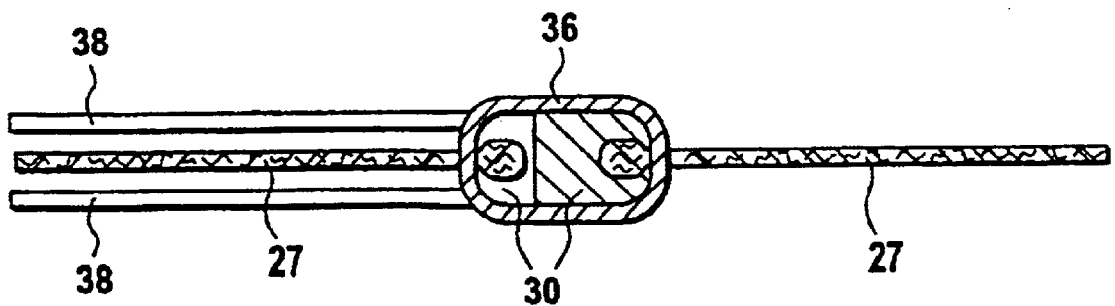
FIG. 3: a section through FIG. 2 with a possible arrangement of the closure element

The melting enclosure member 32 shown in FIG. 2 may, for example, be a melting wire 36, which is looped around the two rows of closure members 30, and which fixes these in their position relative to one another (see also FIG. 3). The melting wire is, for example, passed through the two textile strips 27 of the zip fastener, so that it only encloses the actual closure elements 30. This ensures a secure holding of the-keyed connection.

The melting wire is connected by two electrical lines 38 to a current source, which under the control of the airbag control unit, supplies the melting wire with an appropriate current, in case the, airbag has to be stopped in its inflation procedure to avoid injury to the passenger. The flowing current heats the melting wire to a temperature above its melting respectively sublimation temperature, so that the connection created by the melting wire between the two rows of closure members is broken. As a result of the pressure predominating in the airbag at this time, the two rows of closure members are pulled apart at their now free ends, and the zip fastener opens as described above without substantial expenditure of force.

Figure 4:
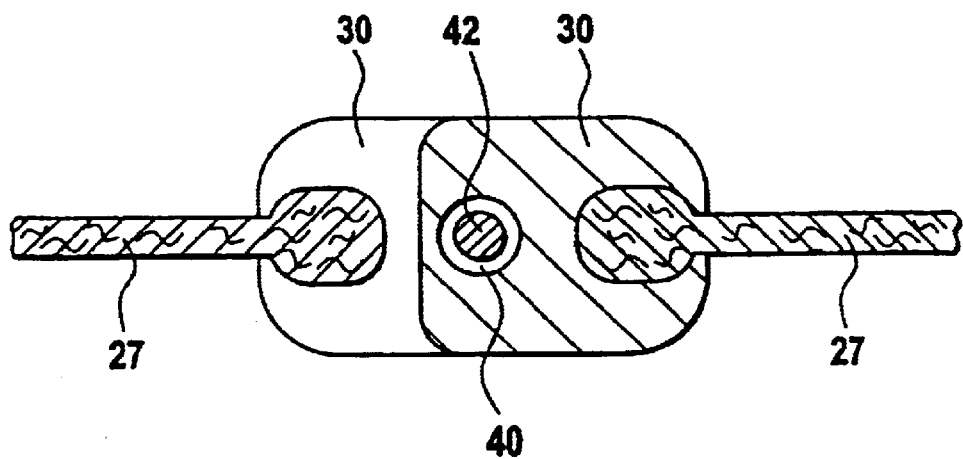
FIG. 4: an alternative possibility for the arrangement of the closure element.

An alternative embodiment of the closure element 32 is shown in FIG. 4. This embodiment may be used, for example, in conjunction with a zip fastener with closure members 30 designed in a loop shape. In the case of zip fasteners of this kind, a longitudinal channel 40 is formed in the interior of the chain formed by the interlocking closure members 30, into which a melting wire 42 can be inserted. In this context, the melting wire can be fed through all or merely through some of the closure members. In the first case, the electrical supply lines are connected at the two ends of the zip fastener to the melting wire. In the second case, in which, for example, the melting wire is merely fed through two adjacent closure members, the melting wire is preferably passed between the closure members out of the chain of closure members and connected to the electrical supply lines at these positions.

Figure 5:
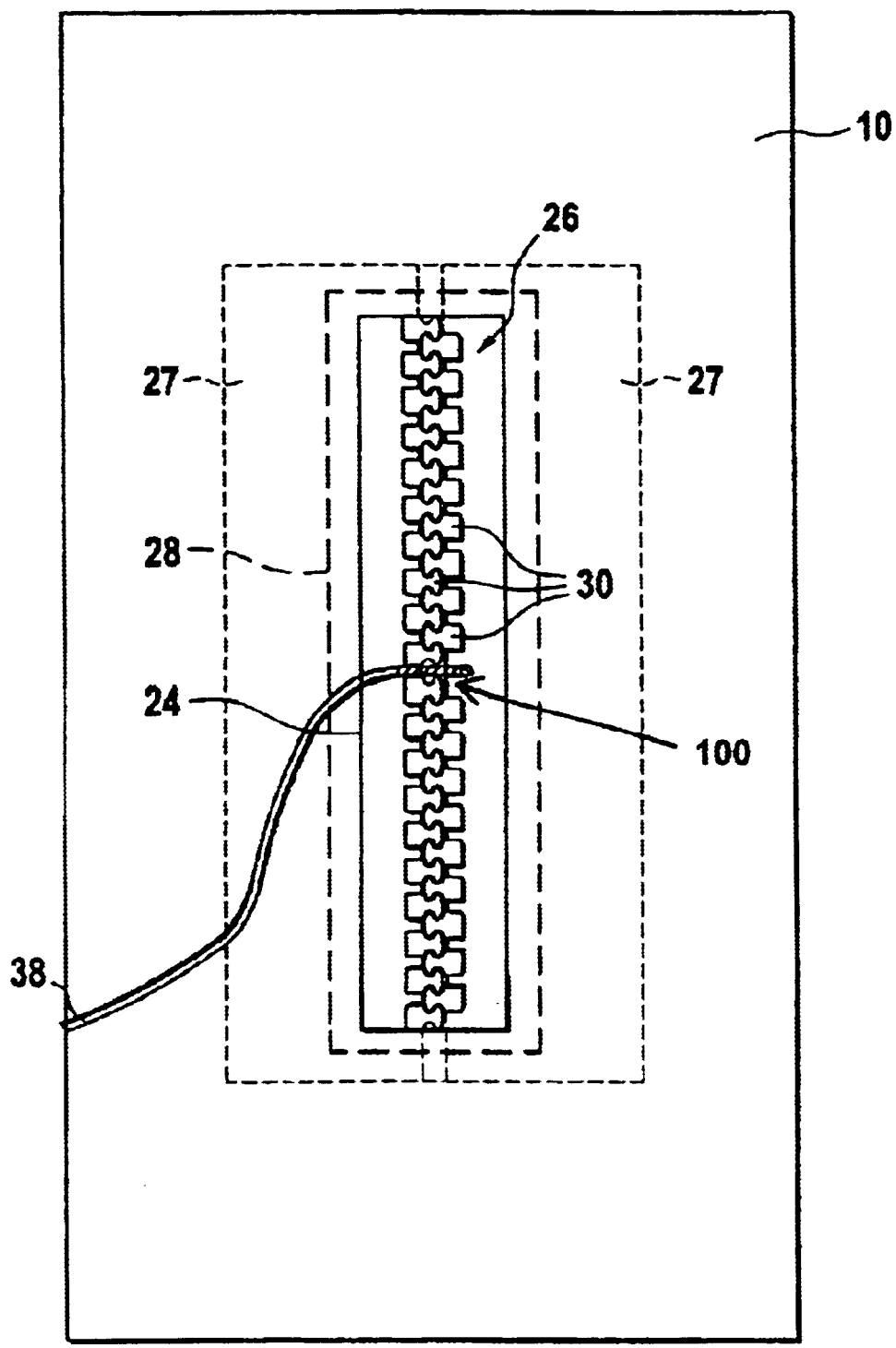
FIG. 5 illustrates the opening or gap in one of the rows of closure members.

It should be noted that the closure element 32 need not be arranged in one of the end regions of the zip fastener 26. In one alternative embodiment as shown in FIG. 5, the zip fastener 26 may comprise an opening 100 at any desired position in the interlocking rows of teeth, which is then secured by the closure element 32 from opening. An opening of this kind can, for example, be produced by cutting out one of the closure elements 30 in one of the two rows.

What is claimed is:

1. A device for deflating a gas bag said gas bag comprising at least one deflation opening which is closed at a breakable, predetermined breaking line, wherein said predetermined breaking line comprises a closure element and wherein said breaking line is breakable by actively and selectively melting or sublimating said closure element at any stage of inflation of said gas bag.

2. The device according to claim 1, wherein said predetermined breaking line comprises a closure seam manufactured according to an appropriate manufacturing technique in the material of said gas bag and wherein said closure element comprises a seam fiber manufactured of said material of said gas bag.

3. The device according to claim 2 wherein an electrical heating element, in particular an electrically conductive heating fiber, is associated with said seam fiber, said heating element heating said seam fiber to a temperature above the melting temperature of said material of said gas bag at at least one position when an electrical current is passed through said heating element.

4. The device according to claim 1, wherein said predetermined breaking line comprises a closure seam and wherein said closure element comprises a seam fiber made from an electrically conductive material.

5. The device according to claim 1, wherein said predetermined breaking line comprises a first and a second row of closure members, said closure members of said first row being arranged on a first edge of said deflation opening of said gas bag, and said closure members of said second row being arranged in such a manner on a second edge of said deflation opening of said gas bag that said closure members of said first row and said closure members of said second row are offset relative to one another in the direction of said predetermined breaking line, wherein said closure members of said first row and said closure members of said second row interlockingly engage in a closed condition of said gas bag and wherein said closure element comprises an electrically conductive fiber, which holds together said first and said second row of closure members at at least one position.

6. The device according to claim 5, wherein said predetermined breaking line is designed as a slide-less zip fastener, which is worked into said deflation opening of a gas bag.

7. The device according to claim 5, wherein at least one of said rows of closure members comprises a gap in such a manner that a chain formed in said closed condition of said gas bag by said interlocking closure members is interrupted at one position and comprises an opening, and wherein said electrically conductive fiber is arranged for holding together said first and second row of closure members in the region of this opening.

8. The device according to claim 5, wherein said closure members of said first row and said closure members of said second row do not interlock at one position, in such a manner that a chain formed in said closed condition of said gas bag by said interlocking closure members is interrupted at this position and comprises an opening, and wherein said electrically conductive fiber is arranged for holding together said first and second row of closure members in the region of this opening.

9. The device according to claim 5, wherein said closure element encloses said first and second row of closure members.

10. The device according to claim 5, wherein at least some of said closure members of said first and second row are designed in a loop shape in such a manner that a chain formed in said closed condition of said gas bag by said interlocking closure members comprises a longitudinal channel at one position in the interior of said loop-shaped closure members running in the direction of said predetermined breaking line, and wherein said closure element is inserted at least partially in said longitudinal channel.

11. The device according to claim 5, wherein said melting or sublimation of said closure element is caused by an electrical current passing through said closure element.

12. The device according to claim 1, wherein said gas bag is an airbag.

13. A passenger safety system for a vehicle comprising at least one airbag, said airbag comprising at least one deflation opening which is closed at a breakable, predetermined breaking line, wherein said predetermined breaking line comprises a closure element and wherein said breaking line is breakable by actively and selectively melting or sublimating said closure element at any stage of inflation of said gas bag, a sensor device for detecting the relative position of said passenger relative to said airbag, and a control device, said control device controlling the melting or sublimation of said breaking line on the basis of a position signal determined by said sensor device at a given position of said passenger relative to said airbag.

14. The passenger safety system according to claim 13, wherein said control device comprises means for evaluating said position signal from said sensor device with reference to pressure.

15. The passenger safety system according to claim 13, wherein said sensor device comprises at least one sensor, which is arranged on said airbag in a region which is facing said passenger when said airbag is released.

16. The passenger safety system according to claim 15, wherein said sensor is a force sensor arranged on said airbag.

17. The passenger safety system according to claim 16, wherein said force sensor comprises at least two electrode structures, which are arranged at a given distance relative to one another on a textile carrier material and a layer made from a semiconductor material, which is arranged on said electrode structures in an active region of said sensor in direct contact with said electrode structures, wherein said layer of semiconductor material comprises an internal resistance, which varies in dependence upon the deformation of said layer.

18. The passenger safety system according to claim 17, wherein said textile carrier material comprises said airbag material, wherein said electrode structures are attached directly to said airbag.

19. The passenger safety system according to claim 13, wherein said control device comprises means for evaluating said position signal from said sensor device with reference to time.

20. The passenger safety system according to claim 13, wherein said control device comprises means for evaluating said position signal from said sensor device with reference to pressure and time.

* * * * *